United States Patent [19]

Libit

[11] Patent Number: 4,506,897
[45] Date of Patent: Mar. 26, 1985

[54] COLLAPSIBLE LUGGAGE CARRIER

[76] Inventor: Sidney M. Libit, 29 S. LaSalle St., Chicago, Ill. 60603

[21] Appl. No.: 449,496

[22] Filed: Dec. 13, 1982

[51] Int. Cl.³ ............................................. B62B 1/04
[52] U.S. Cl. .................................... 280/40; 280/646; 280/655; 280/652; 280/639
[58] Field of Search ................ 280/40, 646, 655, 652, 280/639, 47, 29

[56] References Cited

U.S. PATENT DOCUMENTS

| 1,409,838 | 3/1922 | Emery et al. | 280/40 |
| 3,043,603 | 7/1962 | Major, Sr. | 280/40 |
| 3,241,852 | 3/1966 | Muller et al. | 280/40 |
| 4,398,736 | 8/1983 | De Wijn | 280/40 |

FOREIGN PATENT DOCUMENTS 142320  7/1951  Australia ............................. 280/40

Primary Examiner—Richard A. Bertsch
Attorney, Agent, or Firm—Hill, Van Santen, Steadman & Simpson

[57] ABSTRACT

A collapsible luggage carrier has a base with depending peripheral walls forming a boundary enclosed underside in which hinged wheel brackets are affixed to the underside at hinge points spaced from one another a distance sufficient to allow wheels carried by the brackets to be collapsed inwardly in opposed folded non-overlapped relation. A U-shaped cross-section lock bracket is hinged to one of the peripheral walls or to a cross wall with the legs of the bracket directed inwardly towards the underside of the base, the legs being spaced apart a distance sufficient to engage the wheel brackets in both the wheel collapsed and wheel extended positions and to retain the wheels respectively in each of said positions.

9 Claims, 7 Drawing Figures

4,506,897

COLLAPSIBLE LUGGAGE CARRIER

BACKGROUND OF THE INVENTION

1. Field of the Invention

This invention relates to luggage carriers, and more particularly to collapsible luggage carriers.

2. Prior Art

In recent years, for many reasons, including the long distances travellers must walk in airports carrying their luggage, luggage carriers have undergone a developmental transformation. From originally rigidly constructed hand truck type carriers formed of bent and welded tubing, luggage carriers have evolved to small, lightweight collapsible members generally formed of stiff wire or small diameter rod. While such lightweight collapsible carriers have enjoyed increasing popularity, the majority appear to suffer from two common disadvantages. They are generally equipped with small diameter wheels making movement over rough terrain or upstairs difficult and, they are awkward to collapse and not easy to transport in the collapsed position.

It would therefore be a distinct advance in the art of collapsible luggage carriers to provide such a device having relatively large diameter wheels, good structural stability, lightweight and which is quickly and easily collapsible into a substantially flat neat package.

SUMMARY OF THE INVENTION

My invention overcomes the disadvantages of prior art and provides a collapsible luggage carrier which has each of the above mentioned advantages. The carrier can be equipped with large wheels, while still retaining an ability to collapse into a small rectangular box-like assemblage which is substantially flat on all six sides.

My collapsible luggage carrier consists of a base member or base frame which includes a flat surface having flanged walls depending from one side thereof adjacent the periphery thereof to produce a hollow bordered undersurface for the base. Hingedly attached to the undersurface of the base are a pair of spaced wheel brackets which are pivotable between an uncollapsed position projecting from the undersurface of the base to a collapsed position substantially parallel with the undersurface of the base. The hinges are spaced apart such that the wheels can collapse towards one another and be confined within the boundary walls of the hollow undersurface.

A locking bracket member is attached to either the peripheral wall of the underside or to a separate projecting cross wall. The locking bracket is substantially U-shaped in cross-section having inwardly projecting legs which are dimensioned apart from one another by a distance such that they may engage the bight outer surface of the wheel brackets when the brackets are in the collapsed position to retain the wheel brackets in the collapsed position and engage the opposed legs of the two wheel brackets when the wheel brackets are in the extended position, thereby retaining the wheel brackets in either the collapsed or the extended position. Preferably, the legs of the locking bracket are resiliently yieldable so as to provide an interference fit with the wheel brackets in both positions.

Pivotally attached to the side walls of the base is a U-shaped frame member. The frame member in a pivoted down position where it projects beyond the base substantially normal to the base functions as a support for luggage to be carried by the device. The frame member, in its non-pivoted position, where it projects parallel to the base, can function as a carrying handle for the device.

The device is also provided with a telescoping collapsible handle which is dimensioned to fit either interior of the hollow underside or within the frame member when in its telescoped collapsed position and which is extendable from the telescoped collapsed position and insertable through an opening in a base depending wall and engageable with an aligned positioning and locking member carried on the opposite base depending wall with the majority of the telescoping handle projecting beyond the base and terminating in a grip portion.

It is therefore an object of this invention to provide an improved lightweight collapsible luggage carrier utilizing large wheels.

It is another, and more specific object of this invention to provide a lightweight collapsible luggage carrier having a base member with an undersurface, a pair of hinged wheels carried by said undersurface pivotable between a collapsed position parallel to the undersurface and an extended position normal to the undersurface and a spacer member spanning the wheels in the collapsed position and retaining them in position and spanning the distance between the wheels in the projecting position and maintaining the wheels in the projected position.

It is a further object of this invention to provide a collapsible luggage carrier which is lightweight while equipped with large wheels and which collapses substantially flat, which is easy to extend and collapse and wherein the wheels are held in the collapsed position and in the extended position by a common spanning member.

Other and further objects of this invention will become apparent from a study of the following description together with the attached drawings.

DESCRIPTION OF THE PREFERRED EMBODIMENTS

Figure 1:
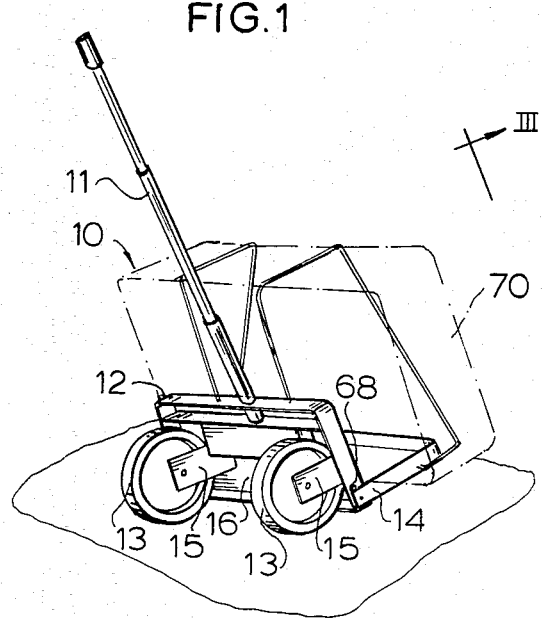
FIG. 1 is a perspective view of the collapsible luggage carrier of this invention.
Figure 2:
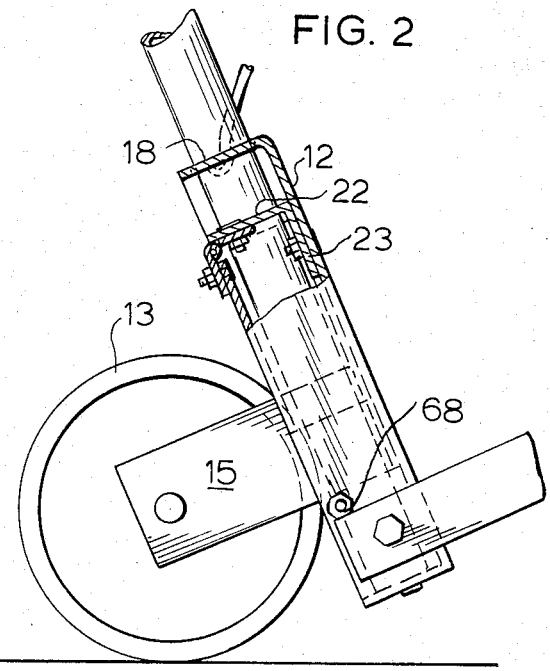
FIG. 2 is a side elevational view, partially in section, of the luggage carrier of FIG. 1.
Figure 3:
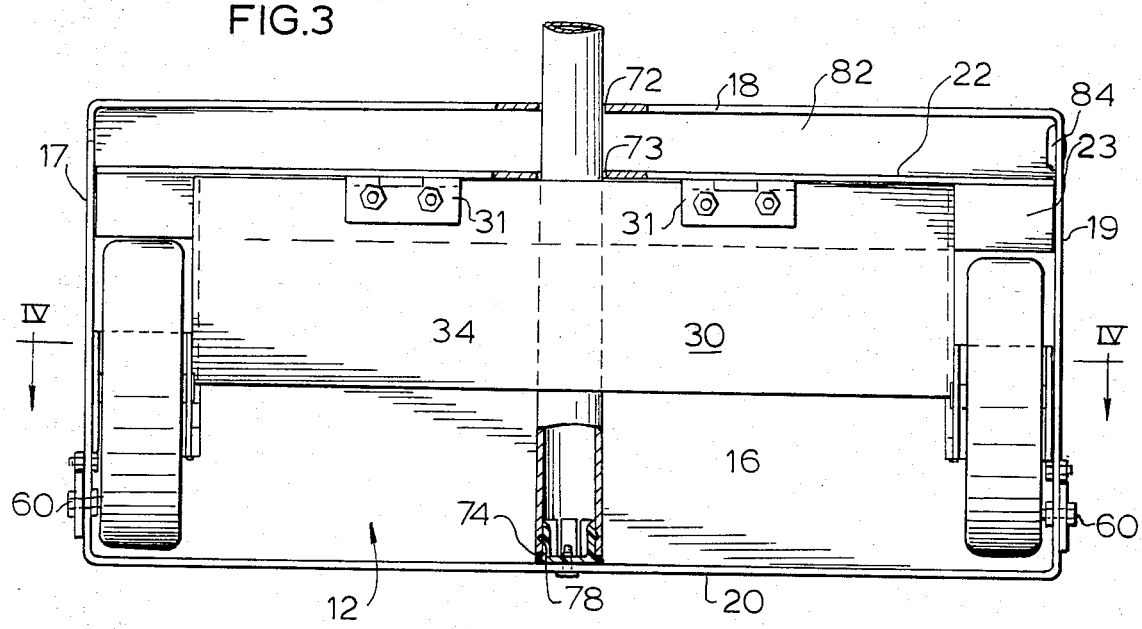
FIG. 3 is a plan view of the underside of the luggage carrier of FIG. 1.

As shown in FIG. 1, the collapsible luggage carrier 10 of this invention consists of a handle member 11, a base member 12, wheels 13 and a support frame 14. The wheels 13 are mounted in first and second U-shaped wheel brackets 15 affixed to the undersurface 16 of the base 12. As best shown in FIG. 3, the undersurface 16 is bounded by a boundary wall formed of depending peripheral walls 17, 18, 19 and 20 attached to the base 12. The walls 17-20 can be formed of a single member. For reasons of strength, the depending walls may either be formed as downturned flanges at the periphery of a base and may be formed out of high strength plastic or metal, or may be formed of L-shaped cross-section extruded aluminum or the like bolted or riveted to the undersurface of a panel member.

The depending peripheral walls 17, 18, 19 and 20 form a boundary enclosed underside of the base. The underside may be sectioned by means of a depending wall 22 which, in FIG. 3, is shown as being formed of an L-shaped member 23 and which spans the distance between the side depending peripheral walls 17 and 19. A locking bracket 30 is hinged to the wall 22 by means such as hinges 31 and extends at least part way over the area from the wall 22 to the bottom depending peripheral wall 20. The locking bracket 30, as best illustrated in FIG. 4 is a U-shaped cross-section having legs 32 and 33 and a bight 34 with the bight being hinged to the wall 22 in such a manner that it is spaced from the surface of the underside 16 by a distance approximately equal to the projection of the legs 32 and 33.

Figure 4:
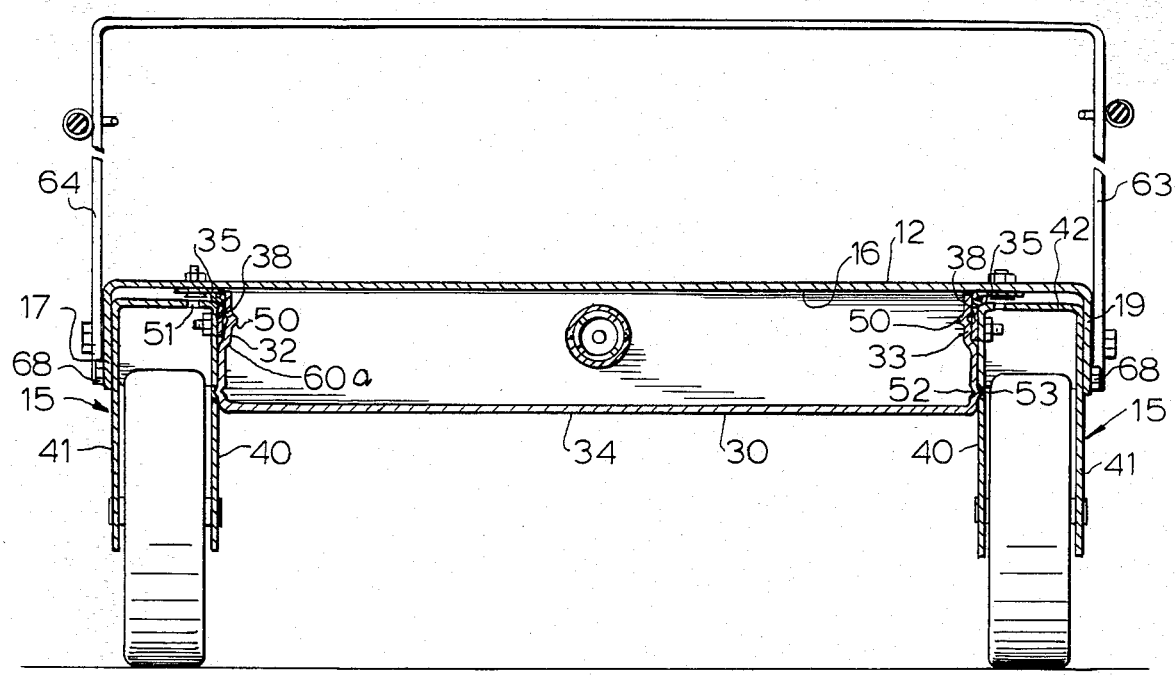
FIG. 4 is a sectional view taken substantially along the lines IV—IV of FIG. 3.

Also, as best shown in FIG. 4, the brackets 15 are U-shaped members having opposed projecting legs 40 and 41 interconnected by a bight 42. The brackets are hinged to the undersurface 16 of the base 12 by hinges 35 connected to the inside leg 40 of each bracket 15, the inside leg being determined when the wheels are in their extended position shown in FIG. 4.

Figure 5:
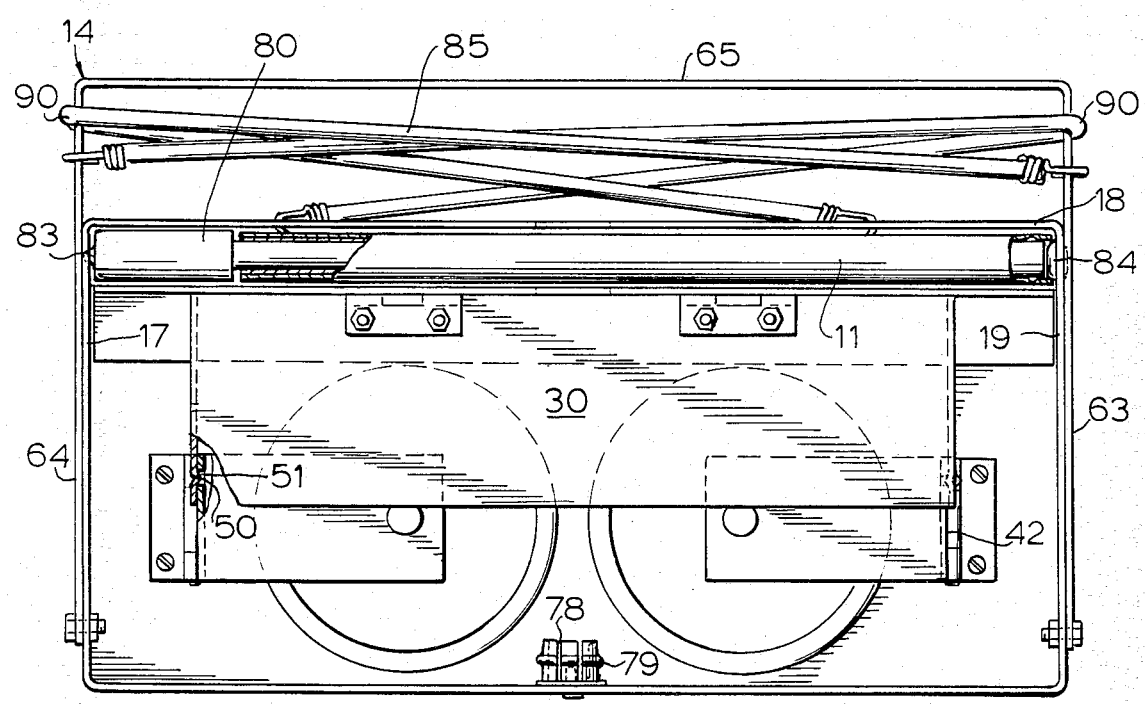
FIG. 5 is a collapsed view of the luggage carrier of FIG. 1 shown from the underside thereof.

Moreover, as shown in FIG. 4, it is preferable if the hinges 35 are positioned such that the brackets 15, when in the projecting position will engage the depending peripheral side walls 17 and 19 limiting further pivotable movement. It will be noted that one leaf 38 of the hinge 35 is affixed to the outside of the legs 40 of the wheel brackets, whereas the other leaf is affixed to the base at a point where it will be overlied by the bight 42 of the wheel brackets when in the extended position. This allows each hinge to pivot the wheels to a collapsed position as shown in FIG. 5 where the wheels lie substantially parallel with the undersurface and in opposed relation.

Moreover, as shown in FIGS. 3 and 4, the bight 34 of the lock bracket 30 is dimensioned such that the legs 32 and 33 will contact the legs 40 of the wheel brackets when the wheel brackets are in their extended position, thereby maintaining them in the extended position. It is preferable if the locking bracket is formed of a resilient material such that the legs are somewhat springy. In such instances, the dimension from the outside surface of the leg 32 to the outside surface of the leg 33 may be such as to provide an interference fit relationship with the inside walls 40 of the wheel brackets to, in effect, resiliently urge the wheel brackets against the depending side walls 17 and 19 and to, by friction, lock up the entire assemblage such that the locking bracket 30 will not pivot away from the locked position. Moreover, it is preferable if the legs 32 and 33 are formed with indents for clearance of the leaves 38 of the hinges 35, substantially as shown in FIG. 4, the indents preferably being formed adjacent the ends of the legs away from the end of the bracket which is hinged to the wall 22. In this manner, when the locking bracket 30 is pivoted away from the position shown in FIGS. 3 and 4, to release the wheel brackets to allow them to be folded or pivoted inwardly to the position shown in FIG. 5, when the locking bracket 30 is thereafter repivoted to the closed position, the legs will engage the bights 42 of the wheel brackets as shown in FIG. 5. This engagement will be under a spring or resilient force due to the indents at the ends of the legs 32 and 33. If desired, however, the inside face of the indent areas can be formed with nips 50 and the bights 42 of the brackets may be formed with recesses 51 such that the nips 50 may snap into the recesses 51 in the wheel collapsed position of FIG. 5. Further, the legs 33 and 32 could be formed with nips 52 which cooperate with recesses 53 of the legs 40 of the wheel brackets as shown at the right-hand side of FIG. 4. When so formed, the locking bracket will snap both into the wheel extended locked position of FIGS. 3 and 4 and the wheel collapsed locked position of FIG. 5. It will be noted that the locking bracket 30 is hinged to the wall 22 at a position of the wall spaced from the wheel axes sufficient such that the wheels may be moved through their pivot arc without engaging the locking bracket 30 when the locking bracket is in a position normal to the underside 16. Although I have shown a locking bracket 30 which extends only approximately to the axles of the wheels, it is, of course, to be understood that a locking bracket could extend substantially the entire distance from the wall 22 to the bottom depending peripheral wall 20 in which case the legs 32 and 33 may be chamfered to allow clearance with the wall 20 during the pivoting motion and the inturned portions or resilient bent portions 60a would then lie intermediate the top and bottom ends, as viewed in FIG. 3, of the bracket adjacent the wheel brackets.

A U-shaped cross-section frame member 14 is pivoted to the side depending peripheral walls 17 and 19 adjacent the bottom wall 20 as at 60. The frame member 14 has side legs 63 and 64 which are longer than the depending peripheral side walls 17, 19 so that, when in the collapsed position with the legs 63, 64 parallel to the walls 17 and 19, the bight 65 of the frame member lies beyond the top depending peripheral wall 18 and provides a carrying handle for the collapsible luggage carrier of my invention.

The frame member 14 is pivotable about the pivot points 60 to a position where it projects approximately normal to the base 12 as shown in FIG. 1. Abutments 68 carried by the walls 17 and 19 prevent movement of the legs 63 and 64 of the frame member to a position beyond the approximately 90° angle of projection from the base. In this position, the frame member 14 provides a support upon which luggage 70 or the like can be carried.

Aligned apertures 72 and 73 formed respectively in the depending peripheral wall 18 and the cross wall 22 are provided for receipt of the telescoping rod handle 11. The handle 11 may be hollow as indicated in FIG. 3 having an opening 74 at one end thereof which is positionable around an annular locating plug 78 attached to the wall 20 aligned with openings 72, 73. The plug 78 may be of the type having projections 79 which may be indexed with recesses or grooves formed in the interior of the hollow tube. The handle is preferably a two to four segment telescoping rod and hollow tube member which may have a handle grip 80 formed at one end thereof opposite the opening 74. Preferably the handle member will collapse to a dimension where it will be received between the depending peripheral side walls 17 and 19 in the opening 82 between the cross wall 22 and the top depending peripheral wall 18, as shown in FIG. 5. Snaps or interfitting nibs and recesses 83 may be provided at the opposed end of the handle 80 and the wall 17 and a wall carried plug 84 may be provided on the wall 19 so that the collapsed handle can be snapped into the area 82 and be retained therein.

Finally, in order to maintain the luggage 70 in place elastomeric cords 85 can be hooked to the wall 18 and to the frame member 14 as illustrated in FIG. 5. Upon slipping the loops 90 off the ends of the frame member, the frame member can then be positioned to the carrying position shown in FIG. 1 and upon doing so, the cords will automatically assume the proper position for insertion of a piece of luggage under the cord. For larger pieces of luggage, the cords are provided with hook ends received in openings in the frame member 14 and depending peripheral wall 18 so as to allow the cords to be unhooked.

Use of the device is extremely simple. Beginning with the collapsed position shown in FIG. 5, the device is erected by pivoting the locking bracket 30 outwardly to free the engagement between the inside of the legs 32 and 33 and the bights 42 of the wheel brackets. Thereafter, the wheel brackets are pivoted outward until their outer legs 41 engage the inside surfaces of the side peripheral walls 17 and 19. Thereafter, the locking bracket 30 is pivoted to its base parallel position thereby engaging the outside surfaces of the legs 32 and 33 with the legs 40 of the wheel brackets maintaining the wheel brackets in the opened position. The handle 11 is removed from the space 82 and telescopically extended. The frame member 14 is pivoted until the legs thereof engage the stops 68. During pivoting the cords 85 have the loops 90 slipped over the ends of the frame member. The open ended portion of the telescope handle is then inserted through the openings 72 and 73 and snapped into engagement with the plug 78. It will be appreciated that erection is thus extremely simple and requires no assembly other than the insertion of the handle into the openings 72 and 73 which automatically aligns the handle with the plug 78.

Collapsing the luggage carrier of my invention is equally simple. The handle is removed, collapsed and inserted into the area 82. The locking bracket 30 is again pivoted outwardly to a point where the wheels are cleared, the wheels are pivoted inwardly about their hinged connection, and the locking bracket is reclosed over the collapsed wheels. The frame member is then pivoted about the pivots 60 and the loose portions of the cord are then stretched around the frame member.

The collapsible luggage carrier of this invention when in its fully collapsed position is substantially flat and compact. A stack height in the collapsed position from the bottom of the locking bracket 30 to the top of the base of approximately 2¼ inches has been provided in a luggage carrier having a wheel diameter of 4⅞ inches and an axial wheel rim width of 1¼ inches with an axle of 1⅜ inches. In that embodiment, the entire device, constructed substantially as shown in FIGS. 1 through 5 readily fits within a standard three-inch attache case with plenty of extra room.

Figure 6:
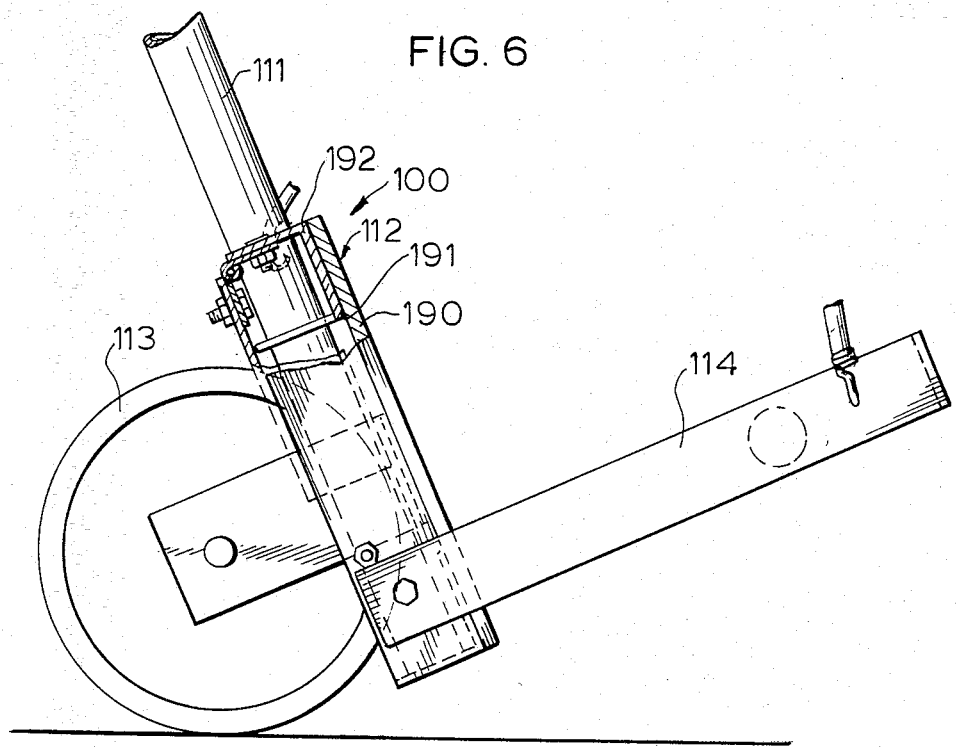
FIG. 6 is a view similar to FIG. 2 of a modified form of the luggage carrier of this invention.
Figure 7:
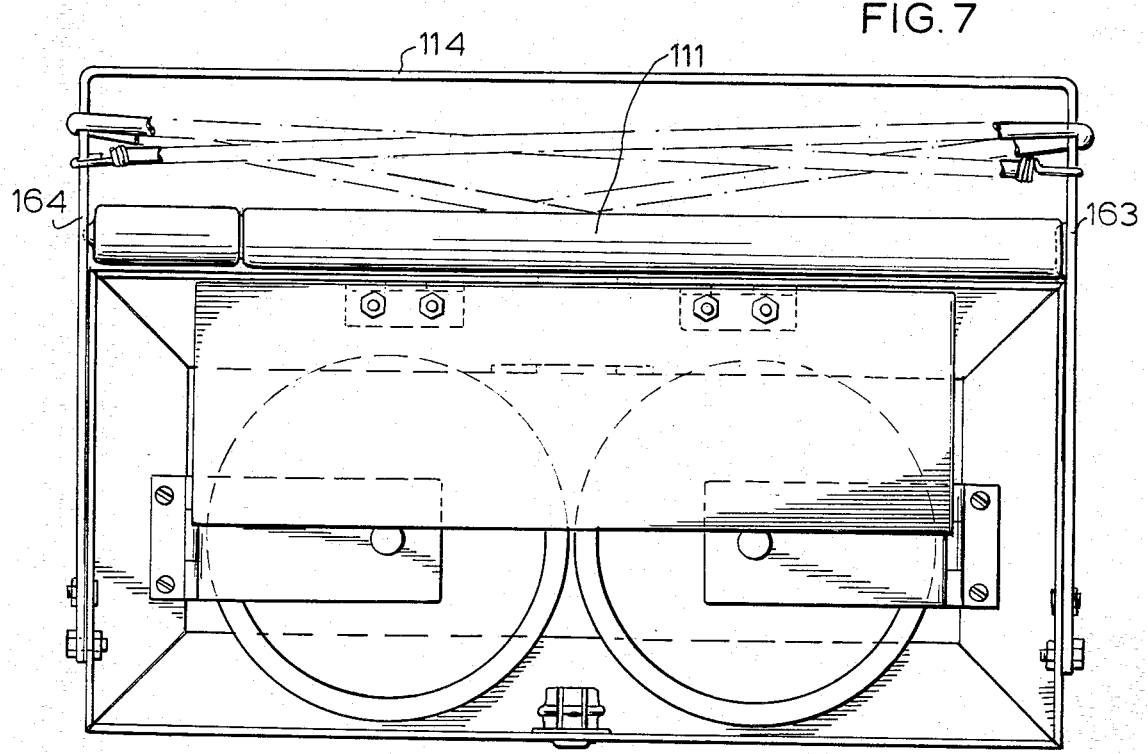
FIG. 7 is a view similar to FIG. 5 of a modified form of FIG. 6.

The collapsible luggage carrier of FIGS. 6 and 7 is substantially the same as FIGS. 1 through 5 with the exception of the fact that the FIG. 6 and 7 luggage carrier 100 does not have the cross wall 22 and is provided with larger diameter wheels 113. In order to accommodate the larger diameter wheels, the cross wall has been eliminated and the handle 111 is now received between the legs 163 and 164 of the frame member 114. In the example shown in FIGS. 6 and 7, the base 112 consists of a board member 190 having an undersurface 191 to which are affixed L-shaped cross-section metal forms 192 to provide the depending peripheral walls. This is in contrast with the device shown in FIGS. 1 through 4 where the walls and base surface are formed from a single member and serves only to show an alternate form of construction.

It will therefore be appreciated from the above, that my invention provides a unique, lightweight, sturdy and easily collapsible luggage carrier which utilizes large wheels foldable between an extended position where they project from the underside of a base with the wheel axes parallel to the base to a collapsed position with the wheels parallel to the base and the axes normal to the base and where the wheels are held in both positions by a common locking bracket member hinged either to a depending peripheral wall of the base or to a depending cross wall of the base.

While various changes and modifications might be proposed by those skilled in the art, it will be understood that I wish to include within the claims of the patent warranted hereon all such changes and modifications as reasonably come within my contribution to the art.

I claim as my invention:

1. A collapsible luggage carrier comprising a base member having an undersurface, first and second wheel brackets hingedly connected to said undersurface, wheels carried by said wheel brackets, said wheel brackets pivotable from a first position to a second position, the first position disposing said wheels rim and axes parallel to said undersurface, said second position disposing said wheels rim and axes normal to said undersurface, said base including a depending boundary wall extending around said undersurface adjacent the periphery thereof, movement of the wheel brackets from the first position to the second position causing said wheels to move inwardly towards one another into opposed relation overlying the undersurface within said boundary wall, a lock bracket pivotably connected to a member projecting from said underside, means on said lock bracket for engaging each of said wheel brackets in said first position and in said second position to lock said wheel brackets in each of said positions, handle means affixable to said base and projecting therefrom and support frame means pivotably carried by said base and pivotable from a first position parallel to said base to a second position substantially normal to said base, said frame means projecting from said base oppositely said wheels when said wheels are in said first position and said frame means is in said second position.

2. The device of claim 1, wherein said handle member is a telescoping handle and is detachable from said base, said device including means for carrying said handle in a detached non-projecting collapsed position.

3. The device according to claim 2, wherein said support frame means is a U-shaped frame member having spaced parallel legs and a bight and is pivotably attached to said depending boundary walls, said depending boundary walls including side walls and top and bottom walls, said attachment of said frame member being by pivotable attachment of said legs to said side walls adjacent said bottom wall on an exterior surface of said side walls, the frame member legs being longer than the side walls and the bight in the first position spaced from the top wall providing a carrying handle for said device.

4. The device according to claim 3, wherein said support frame means and said base include interengaging stop and detent means for positioning said support frame at each of said first and second positions.

5. The device according to claim 3, wherein said wheel brackets include a bracket leg positioned on the side of said wheels opposite the side walls projecting normally to the underside when said wheels are in said first position, said lock bracket including means spanning the distance between the said legs when said wheels are in said first position preventing the movement of said legs towards one another and thereby preventing collapse of the said wheels from the first position to the second position.

6. The device according to claim 5, wherein said lock bracket is a U-shaped cross-section member having spaced legs and a bight, said spaced legs contacting said wheel bracket legs when said wheels are in said first position, said lock bracket movable from a first position where said bight is substantially parallel to said undersurface to a second position where said bight is non-parallel to said undersurface, said lock bracket legs being free of engagement with said wheel bracket legs when the lock bracket is in said second position, whereby said wheel bracket legs may be collapsed to the second position.

7. The device according to claim 6, wherein said lock bracket legs have interior surfaces, said interior surfaces being engageable with said wheel brackets when said wheel brackets are in the second position and said locking bracket is in the first position, said engagement preventing movement of said wheels from said first position.

8. A collapsible luggage carrier comprising a base member having an underside, wheel brackets pivotably attached to said underside and pivotable with respect thereto, locking means carried by said device pivotable with respect to said underside, said wheel brackets pivotable from a first position collapsed with respect to said underside to a second position projecting from said underside, said locking means including a locking bracket having portions thereof covering portions of the wheel brackets when the wheel brackets are in the first position to enclose the portions of the wheel brackets between the locking bracket and the underside, interengaging means between said locking means and said wheel brackets effective to lock said wheel brackets in each of said position.

9. A device according to claim 8 wherein the said wheel brackets include a face portion projecting normal to the underside when in the second position and a face portion projecting normal to the underside when in the first position, said locking means including means to engage said faces when said faces project normal to the underside.

* * * * *